(12) United States Patent
Grushkowitz et al.

(10) Patent No.: US 10,003,298 B2
(45) Date of Patent: Jun. 19, 2018

(54) SOLAR COLLECTOR CABLE SUPPORT TRAY AND SUPPORT SYSTEM

(71) Applicant: SunPower Corporation, San Jose, CA (US)

(72) Inventors: Tyler Grushkowitz, Hayward, CA (US); Brian Wares, Berkeley, CA (US); Vicent Ripoll Agullo, Oakland, CA (US); Shannon Mark Bachart, Orangevale, CA (US); Matthew Scott Lambert, Oakland, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days. days.

(21) Appl. No.: 15/057,942

(22) Filed: Mar. 1, 2016

(65) Prior Publication Data

US 2016/0261232 A1    Sep. 8, 2016

Related U.S. Application Data

(60) Provisional application No. 62/127,256, filed on Mar. 2, 2015.

(51) Int. Cl.
*H02S 20/32* (2014.01)
*H02S 40/34* (2014.01)
(Continued)

(52) U.S. Cl.
CPC ............... *H02S 40/34* (2014.12); *F16L 3/23* (2013.01); *F16L 3/26* (2013.01); *F16M 11/18* (2013.01);
(Continued)

(58) Field of Classification Search
CPC .. H02S 40/34; H02S 20/10; F16L 3/26; F16L 3/23; F16M 11/18; F16M 13/02;
(Continued)

(56) References Cited

U.S. PATENT DOCUMENTS 3,787,016 A * 1/1974 Laval, Jr. .................. F16L 3/23
 211/193
5,125,608 A    6/1992 McMaster
(Continued)

FOREIGN PATENT DOCUMENTS

BE    2400198 A1 * 12/2011 ................ F16L 3/26
CH    2262069 A2 * 12/2010 ................ F16L 3/23
(Continued)

OTHER PUBLICATIONS

International Search Report and Written Opinion issued in PCT/US2016/020268 dated Jun. 15, 2016.
(Continued)

*Primary Examiner* — Kimberly T Wood
(74) *Attorney, Agent, or Firm* — Oblon, McClelland, Maier & Neustadt, L.L.P.

(57) ABSTRACT

A cable tray and support system facilitates cable management in a solar energy collector system at reduced cost relative to previous cable tray and support systems. The cable tray and support system comprises cables trays, mounting brackets, and vertically-oriented piles. The mounting brackets are coupled to the cables trays and vertically-oriented piles. The mounting brackets include one or more stress relief features (e.g., notches) to allow the mounting bracket to provide cantilevered deflection in response to thermal expansion or contraction-of the cable tray. The cable tray and support system also provides a ground path from a cable tray, to the mounting bracket, to the pile, and then to the ground to dissipate transient voltages in the solar energy collection system.

19 Claims, 10 Drawing Sheets

(51) Int. Cl.
| | |
|---|---|
| *H02S 20/10* | (2014.01) |
| *F16L 3/23* | (2006.01) |
| *F16L 3/26* | (2006.01) |
| *F16M 11/18* | (2006.01) |
| *F16M 13/02* | (2006.01) |
| *F24J 2/52* | (2006.01) |
| *H02G 3/04* | (2006.01) |
| *H02G 3/00* | (2006.01) |
| *F24J 2/54* | (2006.01) |
| *F16B 1/00* | (2006.01) |
| *H02G 3/06* | (2006.01) |

(52) U.S. Cl.
CPC ............... *F16M 13/02* (2013.01); *F24J 2/52* (2013.01); *F24J 2/5241* (2013.01); *F24J 2/541* (2013.01); *F24S 25/00* (2018.05); *F24S 25/50* (2018.05); *H02G 3/04* (2013.01); *H02G 3/0437* (2013.01); *H02G 3/263* (2013.01); *H02S 20/10* (2014.12); *H02S 20/32* (2014.12); *F16B 2001/0064* (2013.01); *F24J 2/523* (2013.01); *F24J 2002/5468* (2013.01); *H02G 3/0608* (2013.01); *Y02E 10/47* (2013.01)

(58) Field of Classification Search
CPC .. F24J 2/52; F24J 2/5241; H02G 3/04; H02G 3/0437; H02G 3/0608; F16B 2001/0064
USPC ........... 248/68.1, 65, 70, 49; 211/60.1, 70.4, 211/186, 189, 193, 194, 86.01
See application file for complete search history.

(56) References Cited

U.S. PATENT DOCUMENTS

| | | | | | |
|---|---|---|---|---|---|
| 5,318,264 | A | * | 6/1994 | Meiste | A47B 57/56 108/108 |
| 6,082,690 | A | * | 7/2000 | Durin | H02G 3/263 211/90.01 |
| 7,140,500 | B2 | * | 11/2006 | McCoy | H02G 3/30 211/60.1 |
| 7,497,533 | B2 | * | 3/2009 | Remmers | A47B 57/42 108/108 |
| 7,770,344 | B2 | * | 8/2010 | Betz | H02G 3/0443 52/126.6 |
| 7,797,889 | B2 | | 9/2010 | McClintock | |
| 8,540,090 | B2 | * | 9/2013 | Caveney | H02G 3/0443 211/119 |
| 8,684,319 | B2 | * | 4/2014 | Brouwer | H02G 3/0443 248/235 |
| 9,166,390 | B2 | * | 10/2015 | Dean | F16L 3/26 |
| 2002/0130099 | A1 | * | 9/2002 | Rene | B65D 90/0053 211/189 |
| 2004/0104322 | A1 | * | 6/2004 | Hennequin | H02G 3/263 248/241 |
| 2006/0091088 | A1 | * | 5/2006 | McCoy | H02G 3/30 211/60.1 |
| 2010/0282943 | A1 | | 11/2010 | Boyk | |
| 2011/0155120 | A1 | | 6/2011 | Barsun | |
| 2012/0152868 | A1 | * | 6/2012 | Li | G06F 1/183 211/26.2 |
| 2012/0216851 | A1 | | 8/2012 | Jang | |
| 2013/0139375 | A1 | * | 6/2013 | Rego | F16L 3/23 29/525.11 |
| 2014/0053825 | A1 | | 2/2014 | Zhou | |
| 2014/0182577 | A1 | | 7/2014 | Linderman | |
| 2014/0366464 | A1 | | 12/2014 | Rodrigues | |
| 2015/0323102 | A1 | * | 11/2015 | Juillet | B66C 1/16 248/59 |
| 2016/0195303 | A1 | * | 7/2016 | Lambert | F24J 2/5232 126/605 |

FOREIGN PATENT DOCUMENTS

| | | | | |
|---|---|---|---|---|
| CH | 202016104509 U1 | * | 8/2016 | ............. F16M 13/02 |
| DE | 3936003 A1 | * | 5/1990 | ........... H02G 3/0412 |
| IT | 1475559 A2 | * | 11/2004 | ............. H02G 3/263 |
| JP | 2014-011407 | | 1/2014 | |
| WO | WO 2005-119133 | | 12/2005 | |

OTHER PUBLICATIONS

Search Report and Written Opinion issued in PCT/US2015/066392, dated Mar. 29, 2016.

* cited by examiner

US 10,003,298 B2

SOLAR COLLECTOR CABLE SUPPORT TRAY AND SUPPORT SYSTEM

BACKGROUND

Larger solar collector installations usually include an array of solar collector devices. Such systems can be used in conjunction with photovoltaic modules, thermal solar collector devices as well as concentrators for concentrating solar energy onto photovoltaic devices or thermal solar collection devices.

Some of these solar collector installations include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis.

Further, in some of these systems, the torque tube can be used to both support the solar collector devices and transmit the torque used for adjusting the position of the solar collecting devices. In order to reduce friction which would resist the pivoting movement of the torque tube, some systems include bearings for supporting the torque tube above the ground and so as to be pivotable about the pivot axis. Such systems also include numerous cables to transfer electrical energy from the solar collectors to the utility grid and to transfer signaling instructions across the sun-tracking solar energy system.

BRIEF DESCRIPTION OF THE DRAWINGS

The figures described below depict various aspects of the systems disclosed herein. It should be understood that each figure depicts an embodiment of a particular aspect of the disclosed systems, and that each of the figures is intended to accord with a possible embodiment thereof. Further, wherever possible, the following description refers to the reference numerals included in the following figures, in which features depicted in multiple figures are designated with consistent reference numerals.

SUMMARY

Figure 1:
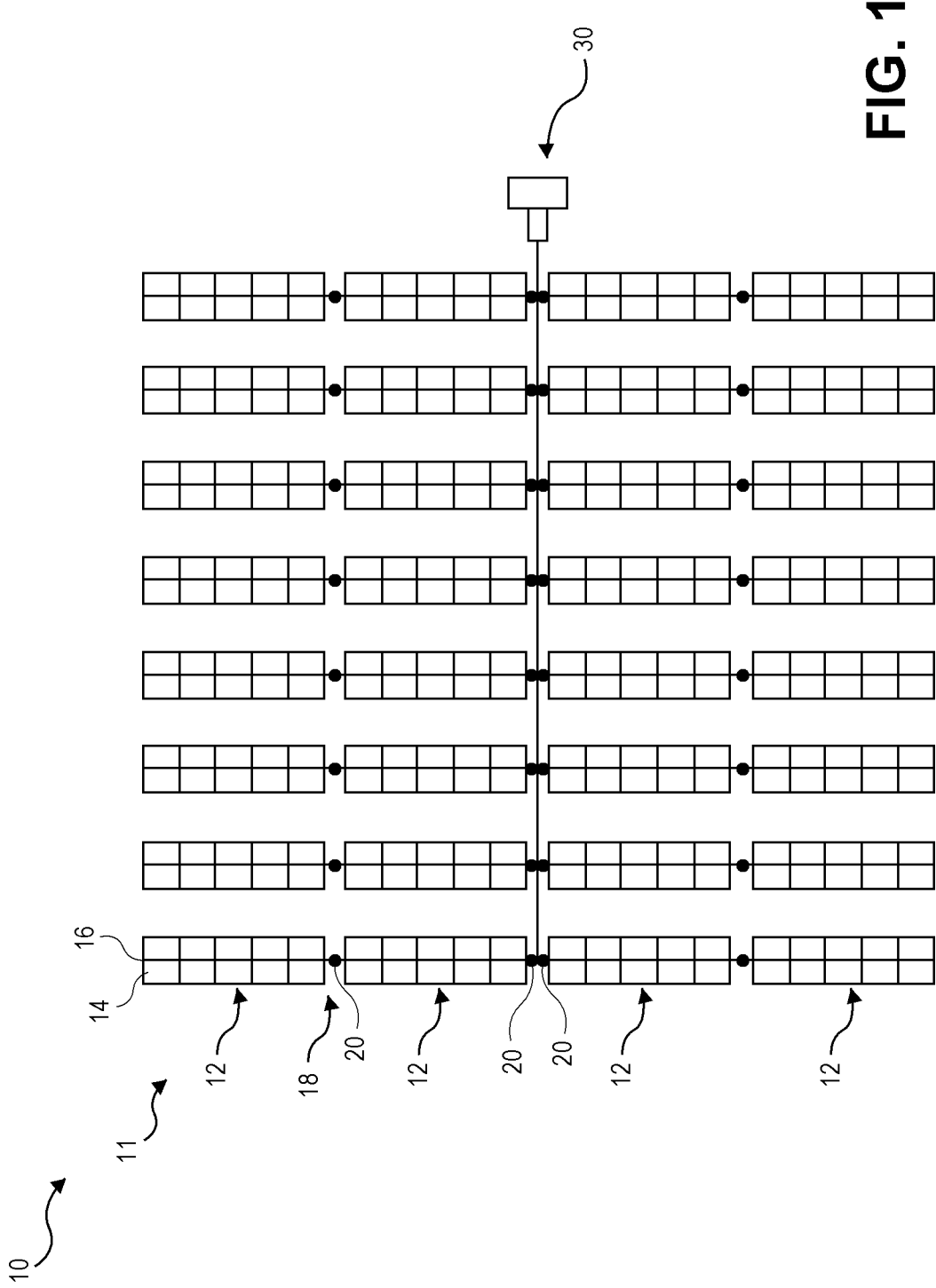
FIG. 1 is a schematic top plan view of a solar collector system.

An aspect of at least one of the embodiments disclosed herein includes the realization that at least one component of certain types of larger solar energy systems can be simplified so as to reduce component costs. For example, some types of larger solar energy systems, for example, which include a plurality of interconnected sun tracking, solar energy collection modules, includes a cable support tray and support system therefor. One typical cable support tray is made from a ladder-like tray. An aspect of the some of the embodiments disclosed herein includes the realization that a simplified and less costly cable support tray can be made from rolled sheet material, such as galvanized sheet steel. Additionally, thermal expansion of such trays can be accommodated with a less costly, simplified design, for example, providing for cantilevered deflection in response to thermal expansion.

In an embodiment, a cable management system comprises a vertically-oriented pile; a mounting bracket comprising: a central member coupled to the vertically-oriented pile by one or more fasteners and having a top end and a bottom end, the central member comprising a top flange extending outwardly from the central member at the top end in a first direction, a first arm extending from the central member in the first direction, the first arm comprising: a first arm wall having a top edge and a bottom edge extending longitudinally in the first direction from the central member, a top flange extending from the first arm wall at the top edge in a second direction toward the central member, the top flange comprising: a first section having a plurality of ports, and a second section coplanar with the first section and defining a first top flange space disposed between the first section and the second section, wherein the top flange of the first arm and the top flange of the central member define a first corner space therebetween; and a first cable tray comprising: a base including an aperture coupled to a first port of the plurality of ports of the top flange of the first arm by a fastener, a first side wall extending vertically from the base, and a second side wall extending vertically from the base; wherein the mounting bracket receives stress applied from the first cable tray to the first arm by: the first section of the top flange of the first arm deflecting at the first top flange space relative to the second section of the top flange of the first arm, the first arm deflecting at the first corner space relative to the corner.

In another embodiment, a cable management system comprises a vertically-oriented pile; a mounting bracket comprising: a central member coupled to the vertically-oriented pile by one or more fasteners and having a top end and a bottom end, the central member comprising: a top flange extending outwardly from the central member at the top end in a first direction, and a bottom flange extending outwardly from the central member at the bottom end in the first direction, and a first arm extending from the central member in the first direction, the first arm comprising: a first arm wall having a top edge and a bottom edge extending longitudinally in the first direction from the central member, the first arm wall including a first notch proximal to the bottom edge and the central member, a top flange extending from the first arm wall at the top edge in a second direction toward the central member, the top flange comprising: a first section having a plurality of ports, and a second section coplanar with the first section and defining a first top flange space disposed between the first section and the second section, a bottom flange extending from the first arm wall at the bottom end in the second direction toward the central member, the bottom flange comprising: a first section, and a second section coplanar with the first section and defining a first bottom flange space disposed between the first section and the second section, wherein the top flange of the first arm and the top flange of the central member define a first corner space therebetween; and a first cable tray comprising: a base including an aperture coupled to a first port of the plurality of ports of the top flange of the first arm by a fastener, a first side wall extending vertically from the base, and a second side wall extending vertically from the base; wherein the mounting bracket receives stress applied from the first cable tray to the first arm by: the first section of the top flange of the first arm deflecting at the first top flange space relative to the second section of the top flange of the first arm, the first section of the bottom flange of the first arm deflecting at the first bottom flange space relative to the second section of the bottom flange of the first arm, and the first arm deflecting at the first corner space and the first notch relative to the central member.

In still another embodiment, a cable management system comprises a vertically-oriented pile; a mounting bracket comprising: a central member coupled to the vertically-oriented pile by one or more fasteners and having a top end and a bottom end, the central member comprising: a top flange extending outwardly from the central member at the top end in a first direction, and a first arm extending from the central member in the first direction, the first arm comprising: a first arm wall having a top edge and a bottom edge extending longitudinally in the first direction from the central member, a top flange extending from the first arm wall at the top edge in a second direction toward the central member, the top flange comprising: a first section having a plurality of ports, and a second section coplanar with the first section and defining a space disposed between the first section and the second section, wherein the top flange of the first arm and the top flange of the central member define a first corner space therebetween, and a second arm extending from the central member in the first direction, the second arm comprising: a second arm wall having a top edge and a bottom edge extending longitudinally in the first direction from the central member, a top flange extending from the second arm wall at the top edge in a third direction toward the central member, the top flange comprising: a first section having a second plurality of ports, and a second section coplanar with the first section and defining a second top flange space disposed between the first section and the second section, wherein the top flange of the second arm and the top flange of the central member define a second corner space therebetween; a first cable tray comprising: a base including an aperture coupled to a first port of the plurality of ports of the top flange of the first arm by a fastener, a first side wall extending vertically from the base, and a second side wall extending vertically from the base; and a second cable tray comprising: a base including an aperture coupled to a second port of the plurality of ports of the top flange of the first arm by a fastener, a first side wall extending vertically from the base, and a second side wall extending vertically from the base; wherein the mounting bracket receives stress applied from the first cable tray to the first arm by: the first section of the top flange of the first arm deflecting relative to the second section of the top flange of the first arm, the first arm deflecting at the first corner space relative to the central member; wherein the mounting bracket receives stress applied from the second cable tray to the second arm by: the first section of the top flange of the second arm deflecting at the second top flange space relative to the second section of the top flange of the second arm, the second arm deflecting at the second corner space relative to the central member; and wherein a continuous electrical grounding path is established from the first cable tray to the vertically-oriented pile via the fastener coupling the first cable tray to the mounting bracket, mounting bracket, and the one or more fasteners coupling the mounting bracket to the vertically-oriented pile, and from the second cable tray to the vertically-oriented pile via the fastener coupling the second cable tray to the mounting bracket, mounting bracket, and the one or more fasteners coupling the mounting bracket to the vertically-oriented pile.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" microinverter does not necessarily imply that this microinverter is the first microinverter in a sequence; instead the term "first" is used to differentiate this microinverter from another microinverter (e.g., a "second" microinverter).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

The inventions disclosed herein are described in the context of photovoltaic arrays and modules. However, these inventions can be used in other contexts as well, such as concentrated PV systems, thermal solar systems, etc.

In the description set forth below, a solar energy collection system 10 is described in the context of being formed by a plurality of solar collection modules, supported so as to be pivotally adjustable for sun-tracking purposes. Each of the modules can include a support member supporting a plurality of solar collection devices as well as wiring for connecting the various solar collection devices to each other and to other modules. The system 10 can also include devices for reducing labor, hardware, or other costs associated with installing such a system. For example, the collection system or the modules included in such a system can be supported above the ground with bearing assemblies that include one or more various features designed to reduce the cost of the manufacture of such bearings and simplify the installation of related components at an installation site.

FIG. 1 illustrates the solar collection system 10 including a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a pile and a bearing assembly 20.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 are connected to each other in an end to end arrangement. However, inventions disclosed herein can be used in the context of other types of arrangements. For example, the system 10 can include a plurality of modules 12 that are arranged such that the torque tube 16 is inclined relative to horizontal, wherein the torque tubes 16 are not connected in an end to end fashion, such as the arrangement illustrated and disclosed in U.S. Pat. No. 8,101,849.

The drive system 30 can be constructed and operated in the manner disclosed with regard to the tilt assembly 50 of U.S. Pat. No. 7,958,886. The entire contents of U.S. Pat. No. 7,958,886 is hereby expressly incorporated by reference.

Additionally, the solar collection devices 14 can be in the form of photovoltaic panels, thermal solar collection devices, concentrated photovoltaic devices, or concentrated thermal solar collection devices. In the illustrated embodiment, the solar collection devices 14 are in the form of photovoltaic panels.

Figure 2:
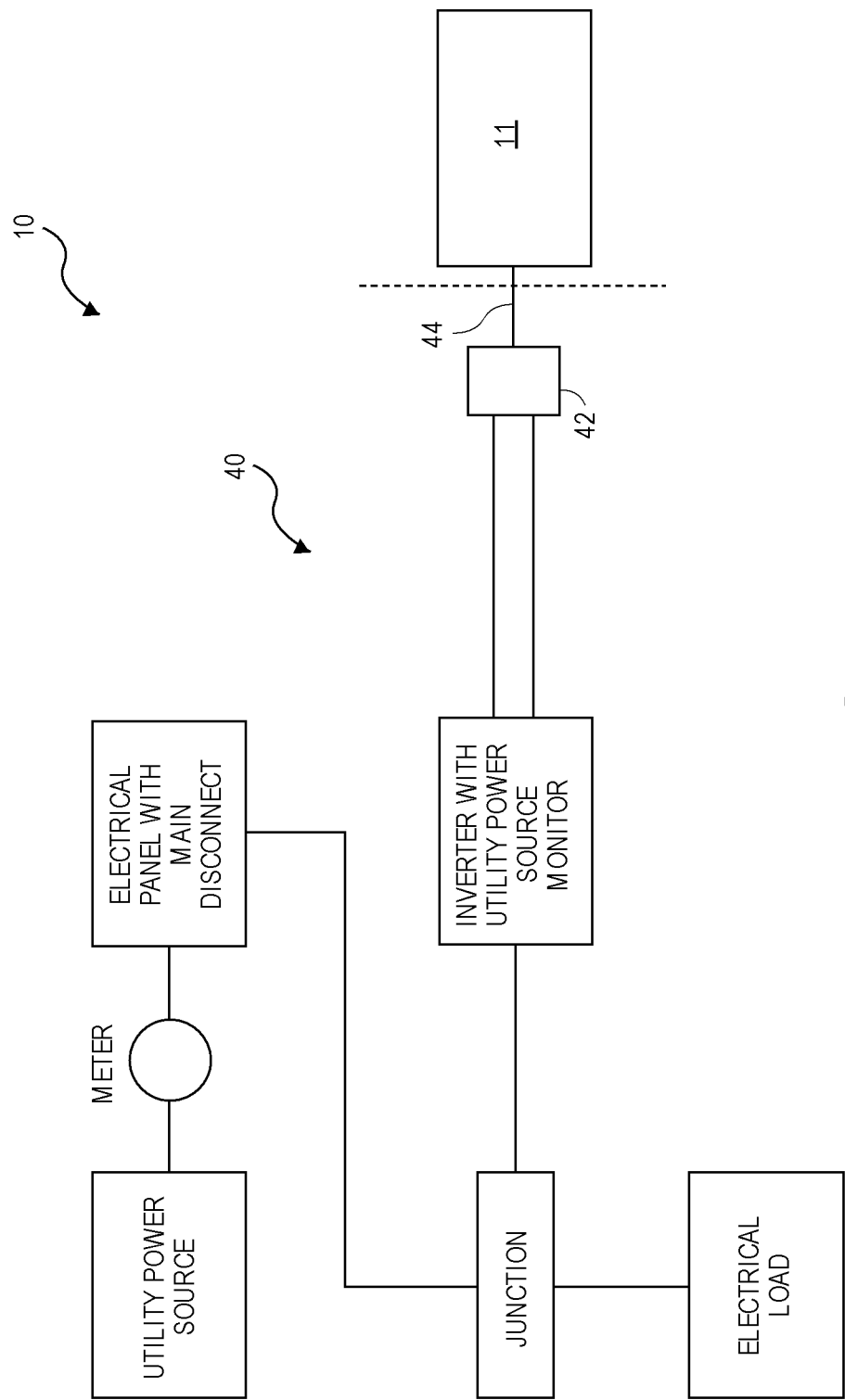
FIG. 2 is a schematic diagram of the system illustrated in FIG. 1 illustrating optional electrical connections of the collector system with various electrical components.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor.

Figure 3:
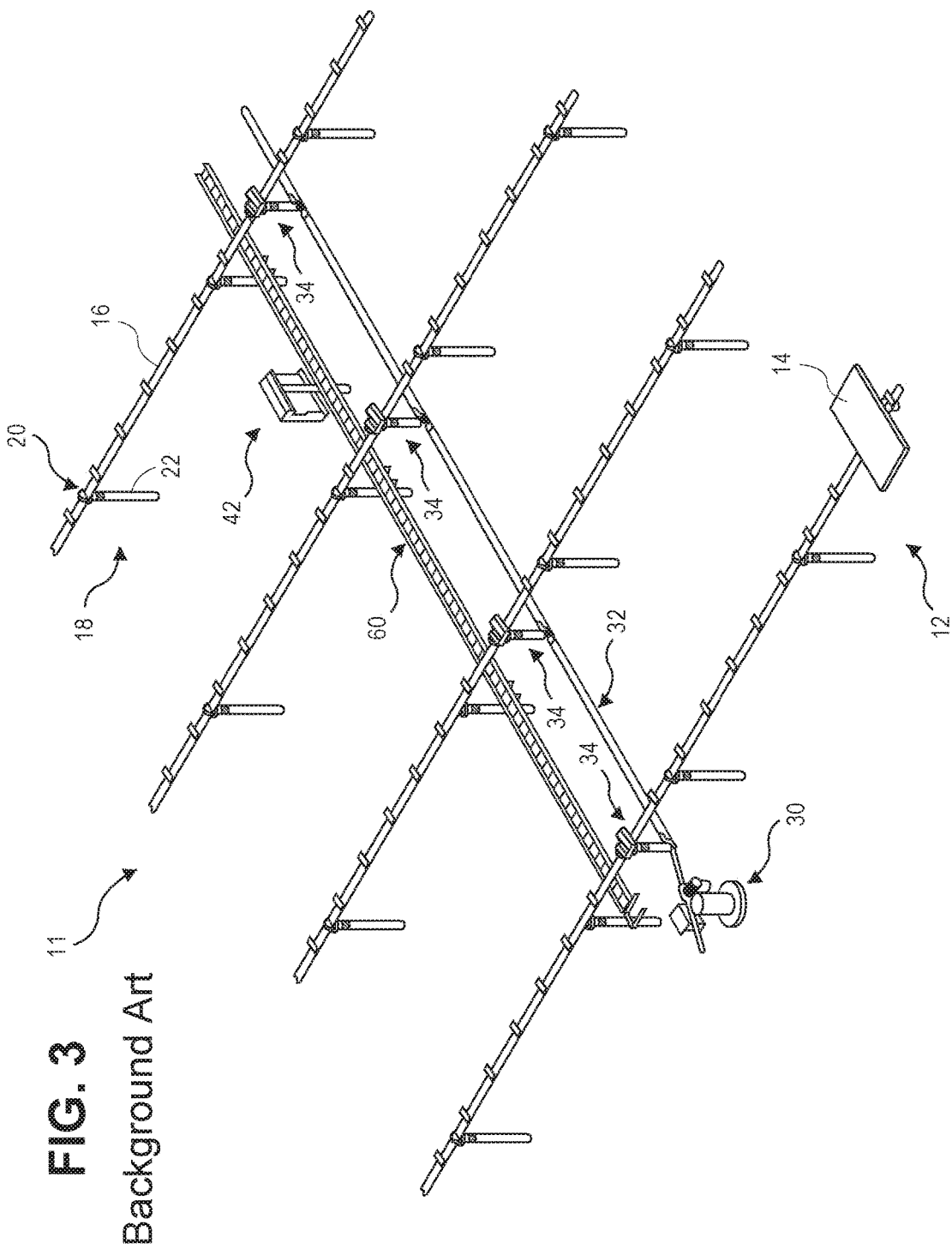
FIG. 3 is a perspective view of the solar collection system of FIG. 1, and illustrating a tracking drive system, a plurality of piles mounted to the ground and supporting a plurality of torque tubes with a plurality of bearing assemblies, and a prior art cable support tray.

FIG. 3 illustrates the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include a cable tray 60 supported by one or more of the piles 22, or by other means. The cable tray 60 illustrated in FIG. 3, is in the form of a prior art ladder type constructed steel tray 60, a more detailed view of which is included in FIG. 4 herein.

Figure 4:
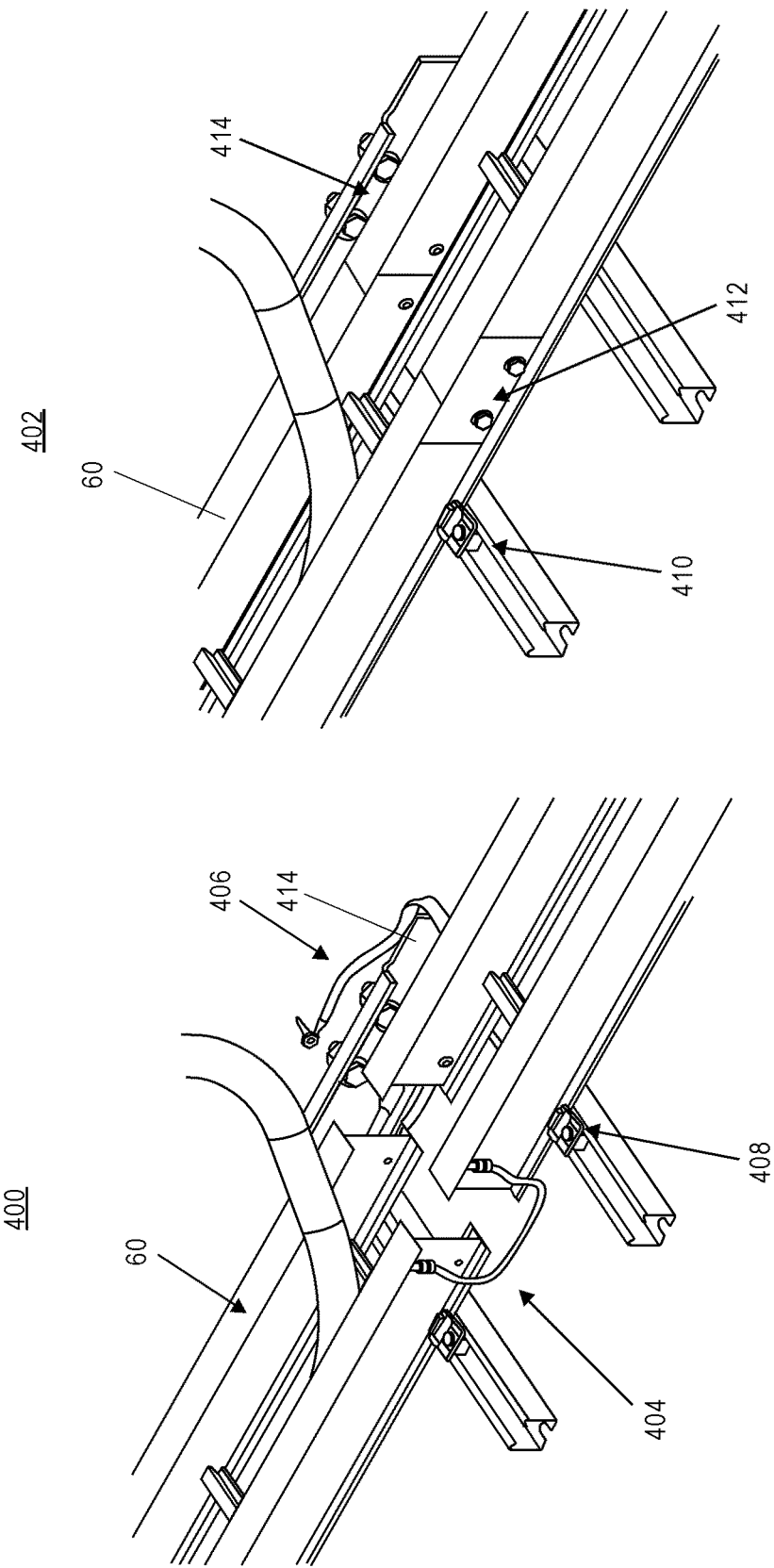
FIG. 4 includes enlarged perspective views of the prior art cable support tray of FIG. 3.

FIG. 4 is a perspective vie of a prior art cable tray 60 and its support system. As shown in FIG. 4, the cable tray 60 is a ladder tray, which advantageously allows drainage and may reduce the accumulation of debris in the cable tray 60. While the primary function of the cable tray 60 is to support the various wires and cables of the solar energy collection system 10, the cable tray 60 and its support system must also be capable of handling additional vertical loads (e.g., accumulated snow, human workers, animals, etc.) and thermal expansion of the cable tray 60. Additionally, for safety and regulatory compliance the cable tray 60 and its support system must also be capable of dissipating transient voltages with an ground connection. Under many regulations, the equipment ground connections between the various components of the cable tray 60 and its support system must be fixed connections (i.e., jumpers, immobile clamps, rivets, bolts, etc. and not sliding ground connections).

FIG. 4 illustrates two types of joints used in a prior art cable tray 60: an expansion joint 400 and a splice joint 402. The expansion joint 400 and splice joint 402 are used alternatively one after the other in the solar energy collection system 10 (i.e., an expansion joint 400 is used at odd numbered rows of solar collection devices 14 and an expansion joint 420 is used at even numbered rows of solar collection devices 14 or vice versa).

The expansion joint 400 includes a grounding jumper 404 providing an electrical grounding connection between the first cable tray 60 and the second cable tray 60 and a grounding jumper 406 providing an electrical grounding foundation connection to the pile (not shown). The cable trays 60 are coupled to the mounting bracket 414 by guide clamps 408, which allow the cable trays 60 to slide across the mounting bracket 414 as the cable trays 60 undergo thermal expansion or contraction. The splice joint 402 includes clamps 410 coupling the cable trays 60 to the mounting bracket 414 and a splice joint plate 412 coupling the first cable tray 60 to the second cable tray 60. Unlike the guide clamps 408, the clamps 410 do not allow the cable trays 60 to slide. Because the splice joint 402 is operatively immobile, each metal-on-metal connection is fixed and thus no grounding connection is required for safety and regulatory compliance.

It will be appreciated that the cable tray 60 and its support system may be changed and improved to reduce the costs to build solar energy collection systems 10 while supporting the cables of the solar energy collection system 10, accommodating thermal expansion and contraction, and maintaining safe and code-compliant grounding connections. One way to reduce costs is to reduce the number of components used to build the cable tray and support system (e.g., removing clamps 404 and 410, jumpers 404 and 406, and/or splice joint plates 412). Another way to reduce costs is to replace more complex and expensive components (e.g., cable trays 60, clamps 404 and 410, mounting bracket 414) with simpler and less expensive components (e.g., cable trays 502 discussed herein, nuts and bolts, rivets, mounting bracket 524 discussed herein, etc.). A third way to reduce costs is to replace more expensive materials (e.g., copper in jumpers 404 and 406) with less expensive materials (e.g., galvanized steel).

Figure 5:
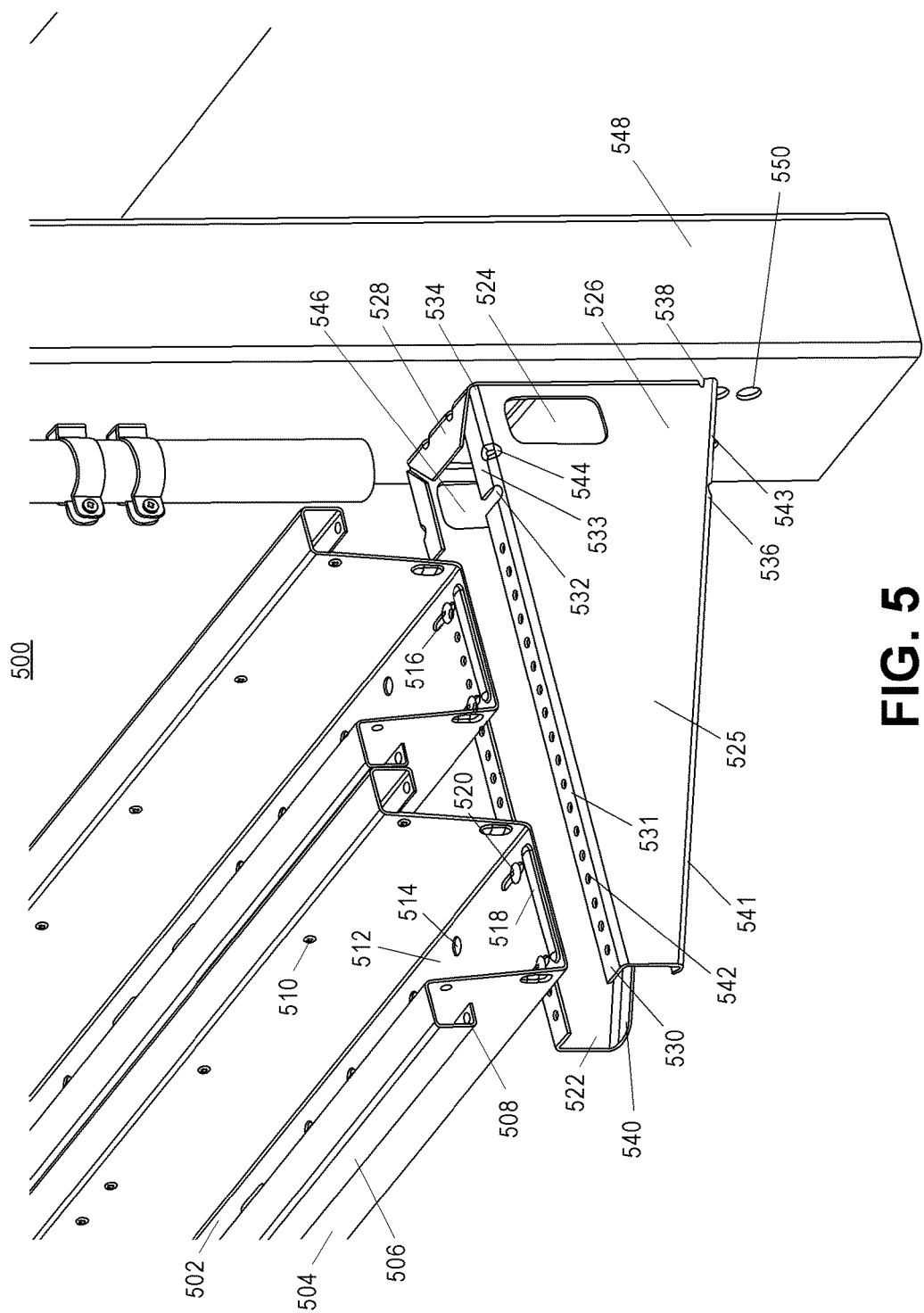
FIG. 5 is a perspective view of a cable support tray and mounting bracket in accordance with the presently described embodiments.

FIG. 5 depicts a cable tray and support system 500 in accordance with the presently disclosed embodiments. Instead of a cable tray 60 and mounting bracket 414 (FIG. 4), the cable tray and support system 500 includes a cable tray 502 and a mounting bracket 522. The cable tray 502 and the mounting bracket 522 may be made of galvanized steel, although other materials may be used such as metals like aluminum or titanium, electrically conductive composite materials, or electrically conductive polymers. As shown in FIG. 5, two cable trays 502 may be connected to the mounting bracket 522 side-by-side. The mounting bracket 522 is coupled to the vertically-oriented pile 548 by one or more fasteners 804 (referring to FIGS. 8A-8B), and supports the weight of the cable trays 502 plus additional vertical loads (e.g., accumulated snow, human workers, animals, debris). In some embodiments, the cable tray and support system 500 is able to support over 700 pounds of vertical load in addition to the weight of the cable trays 502 and mounting bracket 414. In addition to vertical support, the mounting bracket 414 provides for cantilevered deflection in response to thermal expansion or contraction in the cable trays 502. Further, the cable tray and support system 500 provides a continuous (i.e., not sliding) electrical grounding path from the cable trays 502 to the vertically-oriented pile 548 the mounting bracket 522 without using jumpers.

The pile 548 may be a post secured into a foundation deep in the ground at the site of the solar energy collector system 10, and may be laid out in a manner similar to the piles 22 depicted in FIG. 3. The pile 548 may be a metal (e.g., galvanized steel, aluminum, titanium, etc.) post placed in hole in the ground that is then filled with concrete or metal and concrete post driven into the ground by a pile driver. The pile 548 may also be secured to a wide concrete foundation instead of driven into the ground. The pile 548 may also be made out of an electrically conductive composite material or an electrically conductive polymer. The pile 548 includes a plurality of ports 550 adapted to receive a fastener 804 (referring to FIGS. 8A-8B) to couple the mounting bracket 522 to the pile 548 (the fastener 804 is occluded in FIG. 5 by one of the arms 526).

In contrast to the cable tray 60, the cable tray 502 may be made of a single piece of rolled metal with the various features disclosed herein stamped in or otherwise cut out, unlike the ladder-like prior art cable tray 60, which may comprise several individual components assembled together and may involve a more complicated manufacturing process. The cable trays 502 installed on solar energy collector system 10 may vary in length. In some embodiments, the cable trays 502 may be between 9 and 22 feet long, although it will be understood that other lengths may be used. The cable tray 502 includes a base 512 and side walls 504 on either side of the base 512 extending vertically from the base 512. Extending from the side walls 504 on an end distal from the base 512, the cable tray 502 may include a rim 506. The side walls 504 may also include dimples 510 for shipping offsets (discussed herein in relation to FIG. 9) and to keep a gap between adjacent, installed cable trays 502. The cable tray 502 may also include one or more drain holes 514 in the base 512 to allow water to drain from the cable tray 502. The cable tray 502 may also include an embossment 518 on the base 512 and/or side walls 504. Because the edges of the cable tray 502 may be sharp enough to damage cables (not shown in FIG. 5) lying in the cable tray 502, the embossment 518 may prevent the cables from contacting the edges of the cable tray 502 and being cut or otherwise damaged. The risk for damage to the cables may be particularly high during installation of the cables when installers may be moving the cables through the cable tray 502. The cable tray 502 also includes one or more apertures 516 in the base 512. The apertures 516 are adapted to receive a fastener 520 to couple the base 512 of the cable tray 502 to the mounting bracket 522. The apertures 516 may be elongated to allow for the fastener 520 to be received in a range of locations to accommodate sloped terrain and slight variability in the distance between piles 548. The fasteners 520 may be any of a rivet, nut and bolt, screw, etc. It will be appreciated that the fastener 520 may represent a cost savings over the clamps 408 and 410 discussed herein. It will be understood that a two-armed mounting bracket 522 such as the one depicted in FIG. 5 may be thus coupled to four cable trays 502, two side-by-side coupled to each of the two arms 526.

The mounting bracket 522 includes a central member 524 and one or more arms 526 extending from the central member 524 away from the pile 548. The central member 524 may include a top flange 528 extending outwardly from the central member 524 away from the pile 548. The central member 524 may also include a bottom flange 802 (referring to FIGS. 8A-8B) extending outwardly from the central member 524 away from the pile 548 (the bottom flange 802 is occluded in FIG. 5 by one of the arms 526). The top flange 528 and the bottom flange 802 may include a plurality of dimples at the edge proximal to the central member 524. Such dimples may stiffen the top flange 528 and bottom flange 802, respectively.

The one or more arms 526 of the mounting bracket 522 include an arm wall 525. The arm wall 525 extends longitudinally away from the central member 524 in a first direction and includes a tope edge and a bottom edge. The arm wall 525 may include a notch 538 proximal to the central member 524. As discussed herein, the notch 538 may assist in accommodating the thermal expansion and contraction of the cable tray 502. The arm wall 525 may also include a tool cutout 546. The tool cutout 546 may enable easier access to the fasteners coupling the mounting bracket 522 to the pile 548 (e.g., by the tool cutout 546 being large enough to accommodate a wrench, etc.). Extending from the top end of arm wall 525 may be a top flange 530. The top flange 530 extends outwardly from the arm wall 525 in a second direction toward the central member 524. Additionally or alternatively, extending from the bottom end of the arm wall 525 may be a bottom flange 540. The bottom flange extends outwardly from the arm wall 525 in a second direction toward the central member 524. While FIG. 5 depicts the top flange 530 as being co planar with the top flange 528 and the bottom flange 540 as being on an upwardly-oriented diagonal plane intersecting with the plane of the top flange 530 and top flange 528, it will be understood the bottom flange 540 may be on a plane parallel with the plane of the top flange 530 and top flange 528 or on a downwardly-oriented diagonal plane. The corners between the top flange 530, bottom flange 540, and the arm wall 525 may be single angular folds, multiple folds, or continuous rounded folds. The top flange 530 and the top flange 528 may define between them a corner space 534. As discussed herein, the corner space 534 may assist in managing the thermal expansion and contraction of the cable trays 502.

The top flange 530 may include a first section 531 and a second section 533. The first section 531 may include a plurality of ports 542 disposed at intervals along the length of the first section 531. The plurality of ports 542 are adapted to receive the fastener 520, thus coupling the base 512 of the cable tray 502 to the top flange 530 and thus the mounting bracket 524. As depicted in FIG. 5, it may be advantageous to include a ports 542 at regular intervals across the first section 531 because such a configuration allows for variability in the horizontal location of the piles 548 due to terrain or installation variance. For example, if a solar energy collector system 10 has a first pile 548, a second pile 548, and a third pile 548 oriented sequentially in a line running north to south, and the second pile 548 is a few inches east of the first pile 548 and third pile 548, the cable tray and support system 500 could accommodate this variance by the mounting bracket 524 coupled to the second pile 548 receiving the fasteners 520 at ports 542 further way from the central member 524. The second section 533 may include a dimple 544, which may stiffen the second section 533.

The first section 531 and the second section 533 may be separated by a top flange space 532. The top flange space 532 may be a linear notch cut into the top flange 530 and a hemispherical notch in the corner between the arm wall 525 and the top flange 530. It will be understood, of course, that other shapes of notch would also suffice (e.g., a circular, triangular, square, hexagonal, octagonal, etc. notch cut into the top flange 530 and the corner between the arm wall 525 and the top flange 530). While the top flange space 532 depicted in FIG. 5 is orthogonal to the arm wall 525, it will be appreciated that the top flange space 532 could be angled away or angled toward the central member 524. Additionally, the top flange space 532 could be located closer to or further away from the central member 524 than depicted in FIG. 5.

The bottom flange 540 may include a first section 541 and a second section 543. The first section 541 and the second section 543 may be separated by a bottom flange space 536. The bottom flange space 536 may be a linear notch cut into the bottom flange 540 and a hemispherical notch in the corner between the arm wall 525 and the bottom flange 540. It will be understood, of course, that other shapes of notch would also suffice (e.g., a circular, triangular, square, hexagonal, octagonal, etc. notch cut into the bottom flange 540 and the corner between the arm wall 525 and the bottom flange 540). Additionally, the top flange space 536 could be located closer to or further away from the central member 524 than depicted in FIG. 5.

The top flange space 532, corner space 534, bottom flange space 536, and notch 538 may assist in accommodating the thermal expansion and contraction of the cable trays 502 alone or in combination. Depending on the length of the cable tray 502 and the temperature, each cable tray may expand by up to about 6 mm in length or contract by up to about 6 mm in length. Because the cable trays 502 are coupled to a mounting bracket 522 on each end by the fixed fasteners 520, an expanding cable tray 502 will push the mounting bracket 522 on each end and a contracting cable tray 502 will pull on the mounting bracket 522 on each end. In order to relieve the stress applied by this pushing and pulling, the mounting bracket provides for cantilevered deflection one or more of the top flange space 532, corner space 534, bottom flange space 536, and notch 538. The mounting bracket 522 may be capable of accommodating expansion and contraction of the cable tray 502 by up to 10 mm without structural failure (i.e., inelastic bending, cracking, or breaking of the mounting bracket 522) and without fatiguing the material of the mounting bracket 522. In some embodiments, the mounting bracket 522 may include all, some, or just one of the top flange space 532, corner space 534, bottom flange space 536, and notch 538. For example, in some embodiments the mounting bracket 512 may only include the top flange space 532 and corner space 534.

As a push or pull force is applied to the mounting bracket 522, the first section 531 will deflect relative to the second section 533 at the top flange space 532 (if present). The top flange space 532 may spread the stress of the deflection across the portion of the top flange space 532 proximal to the arm wall 525 (e.g., along the hemispherical notch in the corner between the arm wall 525 and the top flange 530). As a push or pull force is applied to the mounting bracket 522, the first section 541 will deflect relative to the second section 543 at the bottom flange space 546 (if present). The bottom flange space 536 may spread the stress of the deflection across the portion of the bottom flange space 536 proximal to the arm wall 525 (e.g., along the hemispherical notch in the corner between the arm wall 525 and the bottom flange 540). Additionally, as a push or pull force is applied to the mounting bracket 522, the arm 522 will deflect relative to the central member at the corner space 534 (if present) and/or at the notch 538.

As discussed herein, the cable tray and support system 500 provides a continuous electrical grounding path from the cable trays 502 to the vertically-oriented pile 548 the mounting bracket 522 without using jumpers. In some embodiments, the cable tray 502, fastener 520, mounting bracket 522, fastener 804, and pile 548 all comprise metal (e.g., steel, aluminum, titanium, etc.) or other conductive material (e.g., conductive composite, conductive polymer). In such embodiments, a continuous ground path is established from the cable tray 502, to the fastener 520, to the mounting bracket 522, to the fastener 804, to the pile 548, and into the earth at the site of the solar energy collector system 10. Such a ground path will safely dissipate transient voltages that may otherwise build up due to arcing, static electricity, or accidental contact with higher potential circuits. This ground path may also be sufficient to satisfy regulatory requirements for grounding the solar energy collector system 10.

Figure 6:
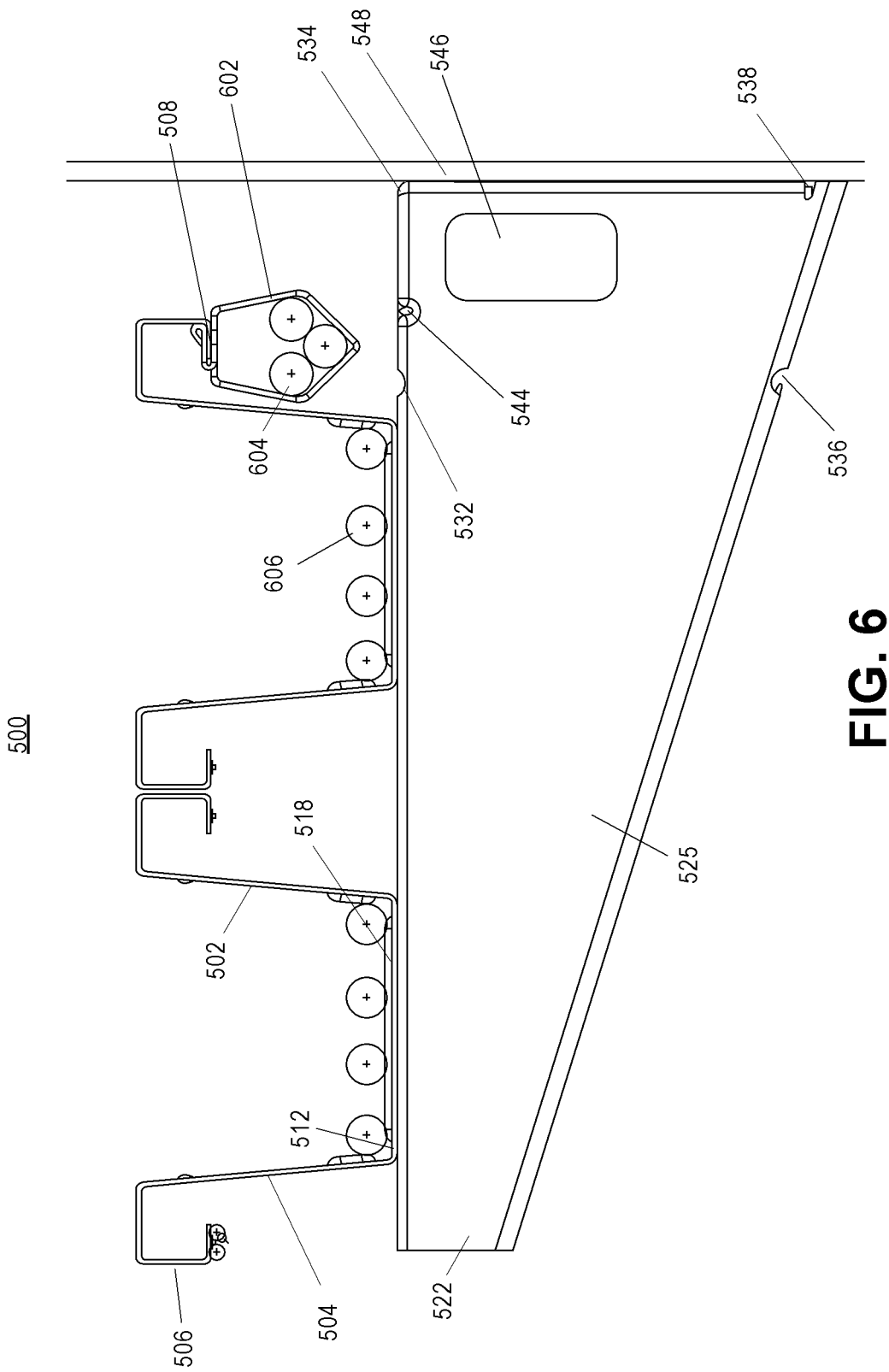
FIG. 6 is a cross-sectional view of a cable support tray and mounting bracket in accordance with the presently disclosed embodiments.

FIG. 6 is s cross-sectional view of the cable tray and support system 500 including additional components. Coupled to the rim 508 on the cable tray 502 proximal to the pile 548 is a wire clip 602. The wire clip 602 may be used to support cables 604. The cables 604 may be low-power signaling cables (e.g., cables connecting sensors, actuators, motors, etc. to control systems configured to communicate with such sensors, actuators, motors, etc.). While three cables 604 are shown in FIG. 6, it will be understood that any number of cables 604 may be used. Disposed inside the cable trays 502 are cables 606. The cables 606 may be AC or DC power cables conducting the electricity generated by the solar energy collector system 10 to an interconnection to a building or larger energy grid (e.g., a utility grid). While four cables 606 are down in each cable tray 502 in FIG. 6, it will be understood that any number of cables 606 may be used (subject to solar energy collector system 10 requirements, safety requirements, regulatory compliance, etc.).

Figure 7:
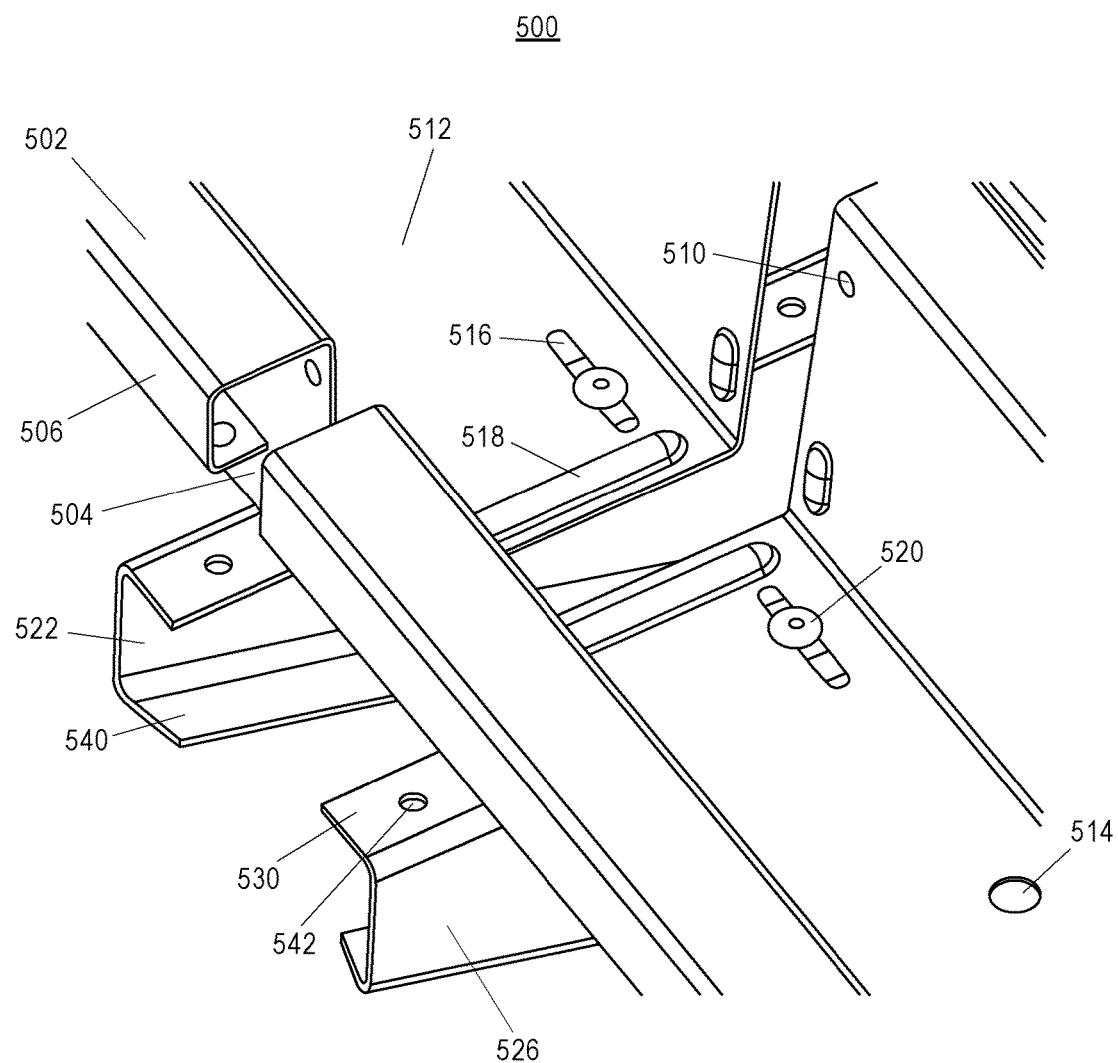
FIG. 7 is a perspective view of two cable support trays and mounting bracket in accordance with the presently disclosed embodiments.

FIG. 7 is a perspective view of the cable tray and support system showing two cable trays 502 running end to end. As discussed herein, a two-armed mounting bracket 522 may support two cable trays 502 side-by-side on each of the two arms 526 for a total of four cable trays 502. When two cable trays 502 run end to end and cables 606 (not shown in FIG. 7) are installed, the cables 606 run through the cable trays 502 and are set off from the edge of the cable trays 502 by the embossments 518 in the side walls 504 and/or base 518.

Figure 8A:
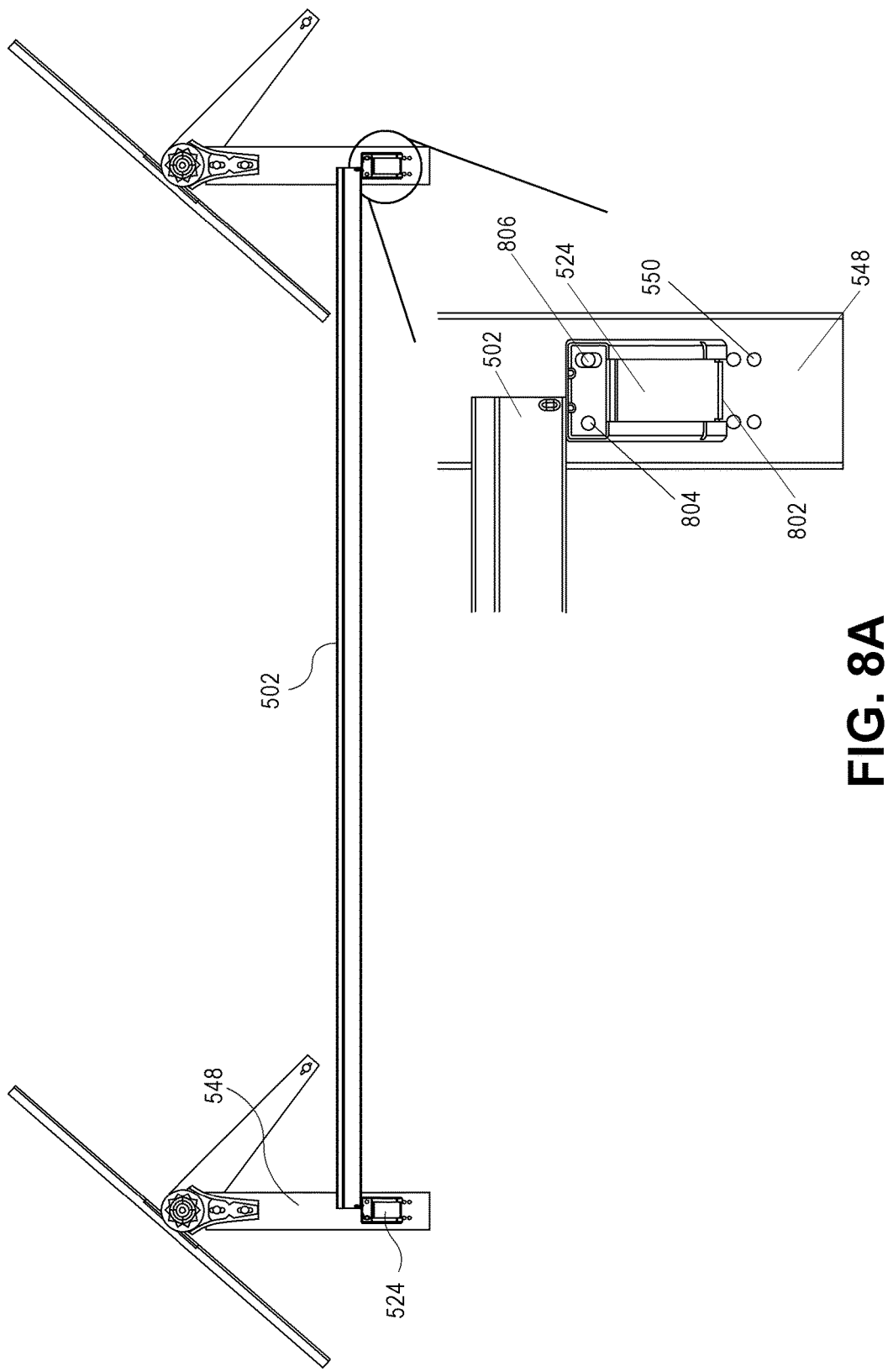
FIGS. 8A-8B are side views of a cable support tray and mounting bracket on flat and sloped terrain in accordance with the presently disclosed embodiments.

FIG. 8A is a side view of a cable tray and support system 500 installed on level terrain. Also shown in FIG. 8A is the bottom flange 802 and fastener 804. The central member 524 may also include a bottom flange 802 extending outwardly from the central member 524 away from the pile 548. The bottom flange 802 may include a plurality of dimples at the edge proximal to the central member 524. Such dimples may stiffen bottom flange 802. The pile 548 includes a plurality of ports 550 adapted to receive a fastener 804 to couple the mounting bracket 522 to the pile 548. The fastener 804 may also be received by a plurality of ports 806 in the central member 524. The fastener 804 may be any of a rivet, bolt (e.g., a ⅝ inch bolt), screw, etc. As shown in FIG. 8A, one of the plurality of ports 806 may be elongated relative to the other and the pile 548 may have a plurality of ports 550 spaced regularly up the body of the pile 548 to accommodate sloped terrain and variance in the height of different piles 548. As shown in FIG. 8A, on level terrain, it may be advantageous to use the two topmost ports 550 to receive the fasteners 804 through the middle of the both of the ports 806 to couple the mounting bracket 524 to the pile 548.

Figure 8B:
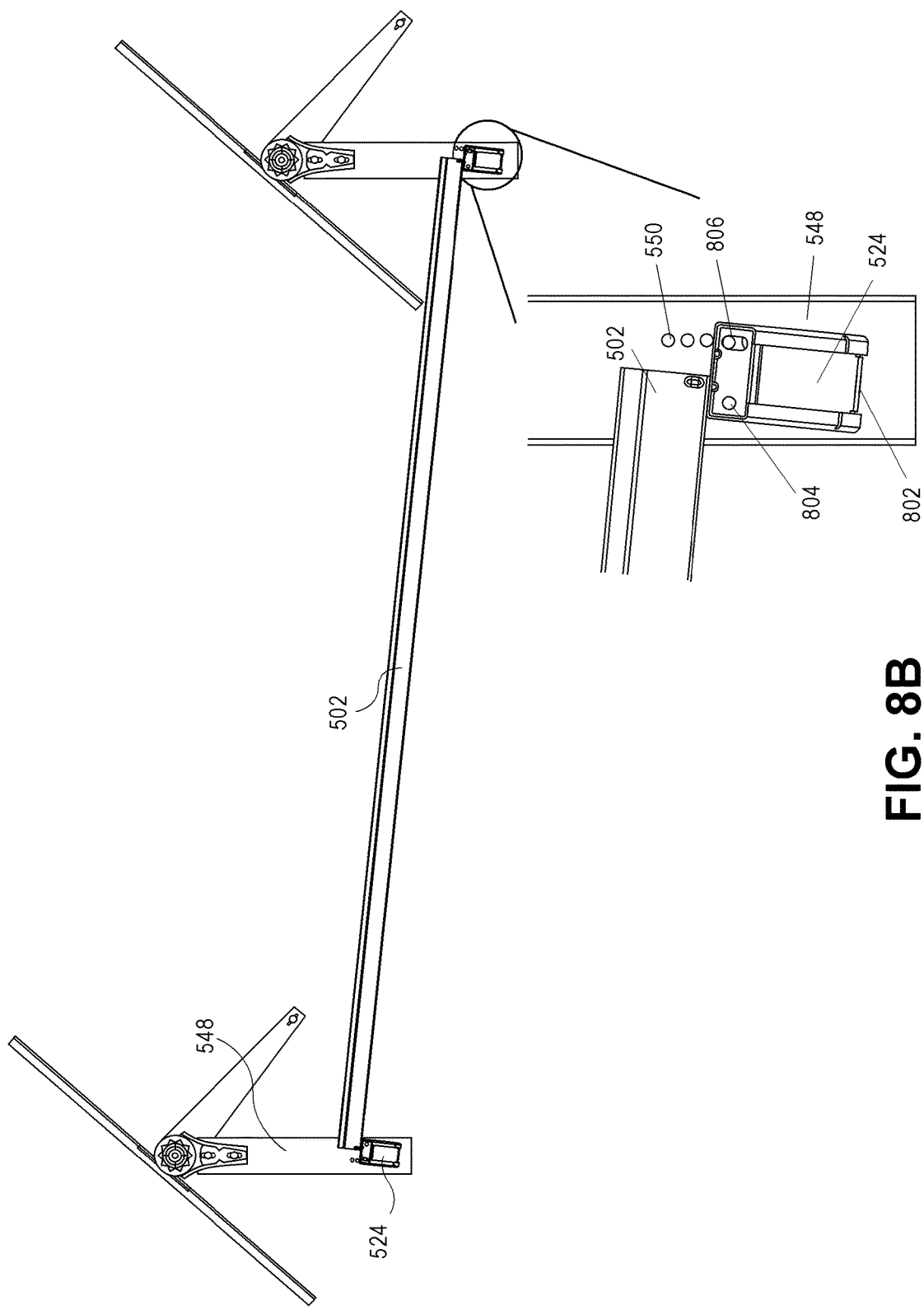

FIG. 8B is a side view of a cable tray and support system 500 installed on sloped terrain. Because one pile 548 is higher than the other, it may be advantageous to use higher or lower ports 550 and to receive the fasteners 804 though the top or bottom portion of the elongated port 806 to couple the mounting bracket 524 to the pile 548.

Figure 9:
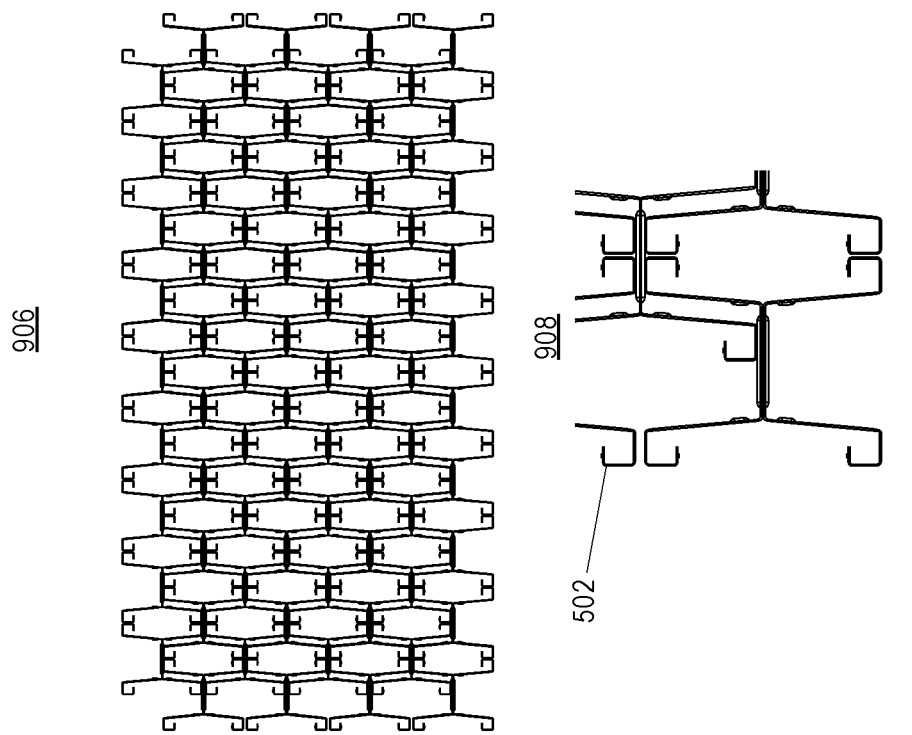
FIG. 9 is a side view of cable support trays arranged in shipping configurations in accordance with the presently disclosed embodiments.
Figure 9:
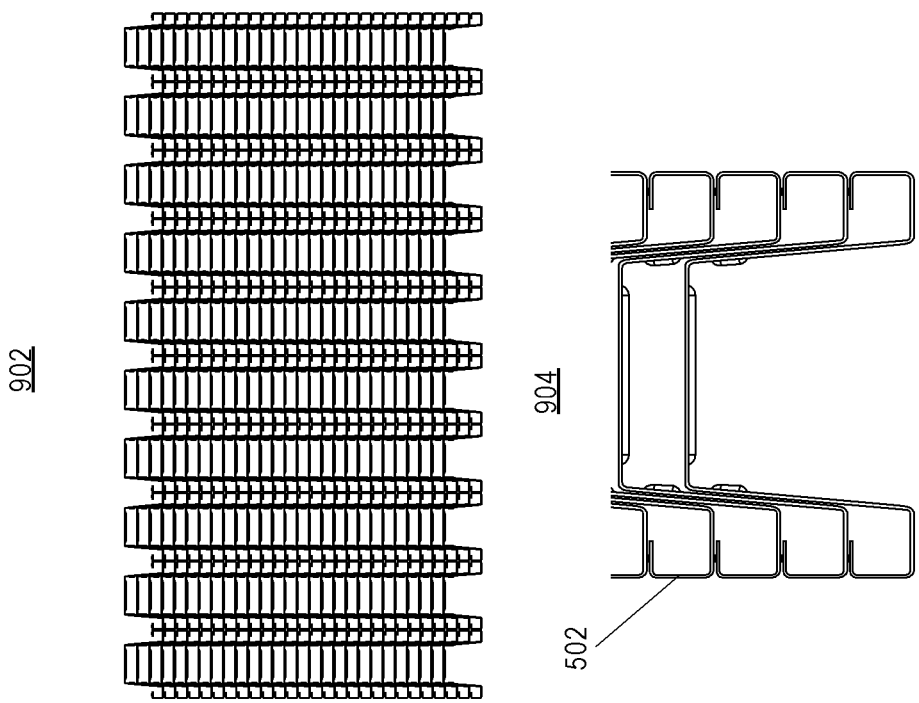

FIG. 9 depicts two groupings of cable trays 502 stacked for shipping. The cable trays 502 may be shipped in a nested configuration 902 (a plurality of stacks of plurality of cable trays 502 stacked directly on top of each other) or an interlocked configuration 906 (a stack of cable trays 502 placed together in alternating vertical orientations). The nested configuration 902 is shown in closer detail in 904. The interlocked configuration 906 is shown in closer detail at 908. Shipping cable trays 502 in a nested configuration 902 may have several advantages including a high density of cable trays 502, a direct load path for the cable trays 502, reduced movement during shipping, and uses the dimples 510 to offset each cable tray 502 from the cable trays 502 stacked above and below. Shipping cable trays 502 in a interlocked configuration 906 has the advantage of giving the cable tray stack more stability, but at the cost of lower shipping density, less accessible loading path for cable trays 502, the potential for lateral movement of cable trays 502 in the stack.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A cable management system comprising:
   a vertically-oriented pile;
   a mounting bracket comprising:
   a central member secured to the vertically-oriented pile by one or more couplers and having a top end and a bottom end, the central member comprising a planar projection extending outwardly from the central member at the top end in a first direction,
   a first arm extending from the central member in the first direction, the first arm comprising:
   a first arm wall having a top edge and a bottom edge extending longitudinally in the first direction from the central member,
   a top flange extending from the first arm wall at the top edge in a second direction toward the central member, the top flange of the first arm comprising:
   a first section of the first arm top flange having a plurality of ports, and
   a second section of the first arm top flange coplanar with the first section of the first arm top flange and defining a first top flange space, the first top flange space disposed between the first section of the first arm top flange and the second section of the first arm top flange and extending across an entire width of the top flange, wherein the top flange of the first arm and the planar projection of the central member define a first corner space the first corner space positioned between and on a same plane as the top flange of the first arm and the planar projection of the central member; and
a first cable tray comprising:
a base of the first cable tray including a first aperture coupled to a first port of the plurality of ports of the top flange of the first arm by a first fastener,
a first side wall of the first cable tray extending vertically from the base of the first cable tray, and
a second side wall of the first cable tray extending vertically from the base of the first cable tray;
wherein the mounting bracket receives stress applied from the first cable tray to the first arm by:
the first section of the top flange of the first arm deflecting at the first top flange space relative to the second section of the top flange of the first arm, and
the first arm deflecting at the first corner space relative to the central member.

2. The cable management system of claim 1 wherein the mounting bracket, first cable tray, and fastener coupling the first cable tray to the mounting bracket form a continuous electrical connection.

3. The cable management system of claim 1 wherein a continuous electrical grounding path is established from the first cable tray to the vertically-oriented pile via the fastener coupling the first cable tray to the mounting bracket, mounting bracket, and the one or more couplers securing the central member to the vertically-oriented pile.

4. The cable management system of claim 1 wherein the mounting bracket further comprises:
a second arm extending from the central member in the first direction, the second arm comprising:
a second arm wall having a top edge and a bottom edge extending longitudinally in the first direction from the central member,
a top flange extending from the second arm wall at the top edge in a third direction toward the central member, the top flange of the second arm comprising:
a first section of the second cable tray having a second plurality of ports, and
a second section of the second cable tray coplanar with the first section of the second arm top flange and defining a second top flange space disposed between the first section of the second arm top flange and the second section of the second arm top flange,
wherein the top flange of the second arm and the planar projection of the central member define a second corner space therebetween;
the cable management system further comprising:
a second cable tray comprising:
a base of the second cable tray including a second aperture coupled to a second port of the plurality of ports of the top flange of the first arm by a second fastener,
a first side wall of the second cable tray extending vertically from the base of the second cable tray, and
a second side wall of the second cable tray extending vertically from the base of the second cable tray;
wherein the mounting bracket receives stress applied from the second cable tray to the second at iii by:
the first section of the top flange of the second arm deflecting at the second top flange space relative to the second section of the top flange of the second arm,
the second arm deflecting at the second corner space relative to the central member.

5. The cable management system of claim 1 wherein the first cable tray comprises steel and the mounting bracket comprises steel.

6. The cable management system of claim 1 wherein the first cable tray is between 9 and 22 feet long.

7. The cable management system of claim 1 wherein the base of the first cable tray includes one or more raised embossments on an end of the first cable tray proximal to the mounting bracket.

8. The cable management system of claim 1 wherein the first cable tray further includes a rim extending from the first side wall on an end distal from the base of the first cable tray, the cable management system further comprising a wire clip coupled to the rim of the first cable tray, the wire clip adapted to support cables disposed on an outside of the first cable tray.

9. The cable management system of claim 1 wherein the base of the first cable tray includes a plurality of drain holes.

10. The cable management system of claim 1 wherein the first aperture of the base of the first cable tray includes a plurality of elongate apertures.

11. The cable management system of claim 1 wherein a body of the first arm includes a tool access cutout.

12. The cable management system of claim 1 wherein the cable management system is coupled to a solar energy collection system.

13. A cable management system comprising:
a vertically-oriented pile;
a mounting bracket comprising:
a central member secured to the vertically-oriented pile by one or more couplers and having a top end and a bottom end, the central member comprising:
a planar projection extending outwardly from the central member at the top end in a first direction, and
a bottom flange extending outwardly from the central member at the bottom end in the first direction, and a first arm extending from the central member in the first direction, the first arm comprising:
a first arm wall having a top edge and a bottom edge extending longitudinally in the first direction from the central member, the first arm wall including a first notch proximal to the bottom edge and the central member,
a top flange extending from the first arm wall at the top edge in a second direction toward the central member, the top flange of the first arm comprising:
a first section of the first wall top flange having a plurality of ports, and
a second section of the first wall top flange coplanar with the first section of the first wall top flange and defining a first top flange space, the first top flange space disposed between the first section of the first wall top flange and the second section of the first wall top flange,
a bottom flange extending from the first arm wall at the bottom end in the second direction toward the central member, the first arm bottom flange comprising:
a first section of the first arm bottom flange, and
a second section of the first arm bottom flange coplanar with the first section of the first arm bottom flange and defining a first bottom flange space disposed between the first section of the first arm bottom flange and the second section of the first arm bottom flange,
wherein the top flange of the first arm and the planar projection of the central member define a first corner space therebetween; and a first cable tray comprising:

a base of the first cable tray including a first aperture coupled to a first port of the plurality of ports of the top flange of the first arm by a fastener,
a first side wall of the first cable tray extending vertically from the base of the first cable tray, and
a second side wall of the first cable tray extending vertically from the base of the first cable tray;
wherein the mounting bracket receives stress applied from the first cable tray to the first arm by:
the first section of the top flange of the first arm deflecting at the first top flange space relative to the second section of the top flange of the first arm,
the first section of the first arm bottom flange deflecting at the first bottom flange space relative to the second section of the first arm bottom flange, and
the first arm deflecting at the first corner space and the first notch relative to the central member.

14. The cable management system of claim 13 wherein the mounting bracket further comprises:
a second arm extending from the central member in the first direction, the second arm comprising:
a second arm wall having a top edge and a bottom edge extending longitudinally in the first direction from the central member, the second arm wall including a second notch proximal to the bottom edge and the central member,
a top flange extending from the second arm wall at the top edge in a third direction toward the central member, the top flange of the second arm comprising:
a first section of the second arm having a second plurality of ports, and
a second section of the second arm coplanar with the first section of the second arm and defining a second top flange space disposed between the first section of the second arm top flange and the second section of the second arm top flange,
a bottom flange extending from the second arm wall at the bottom end in the second direction toward the central member, the second arm bottom flange comprising:
a first section of the second arm bottom flange, and a second section of the second arm bottom flange coplanar with the first section of the second arm bottom flange and defining a second bottom flange space disposed between the first section of the second arm bottom flange and the second section of the second arm bottom flange,
wherein the top flange of the second arm and the planar projection of the central member define a second corner space therebetween;
the cable management system further comprising: a second cable tray comprising:
a base of the second cable tray including a second aperture coupled to a second port of the plurality of ports of the top flange of the first arm by a second fastener,
a first side wall of the second cable tray extending vertically from the base of the second cable tray, and
a second side wall of the second cable tray extending vertically from the base of the second cable tray;
wherein the mounting bracket receives stress applied from the second cable tray to the second arm by:
the first section of the top flange of the second arm deflecting at the second top flange space relative to the second section of the top flange of the second arm,
the first section of the second arm bottom flange deflecting at the second bottom flange space relative to the second section of the second arm bottom flange, and
the second arm deflecting at the second corner space and the second notch relative to the central member.

15. The cable management system of claim 13 further comprising:
a third cable tray comprising:
a base of the third cable tray including a third aperture coupled to a second port of the plurality of ports of the top flange of the first arm by a third fastener,
a first side wall of the third cable tray extending vertically from the base of the third cable tray, and
a second side wall of the third cable tray extending vertically from the base of the third cable tray;
wherein the mounting bracket receives stress applied from the third cable tray to the first arm by:
the first section of the top flange of the first arm deflecting at the first top flange space relative to the second section of the top flange of the first arm,
the first section of the bottom flange of the first arm deflecting at the first bottom flange space relative to the second section of the bottom flange of the first arm, and
the first arm deflecting at the first corner space and first notch relative to the central member.

16. The cable management system of claim 13 wherein the mounting bracket, first cable tray, and first fastener coupling the first cable tray to the mounting bracket form a continuous electrical connection.

17. The cable management system of claim 13 wherein a continuous electrical grounding path is established from the first cable tray to the vertically-oriented pile via the first fastener coupling the first cable tray to the mounting bracket, mounting bracket, and the one or more couplers securing the central member to the vertically-oriented pile.

18. A cable management system comprising:
a vertically-oriented pile;
a mounting bracket comprising:
a central member secured to the vertically-oriented pile by one or more couplers and having a top end and a bottom end, the central member comprising:
a planar projection extending outwardly from the central member at the top end in a first direction, and a first arm extending from the central member in the first direction, the first arm comprising:
a first arm wall having a top edge and a bottom edge extending longitudinally in the first direction from the central member,
a top flange extending from the first arm wall at the top edge in a second direction toward the central member, the top flange of the first arm comprising:
a first section of the first arm top flange having a plurality of ports, and
a second section of the first arm top flange coplanar with the first section of the first arm top flange and defining a space disposed between the first section of the first arm top flange and the second section of the first arm top flange,
wherein the top flange of the first arm and the planar projection of the central member define a first corner space therebetween, and
a second arm extending from the central member in the first direction, the second arm comprising:
a second arm wall having a top edge and a bottom edge extending longitudinally in the first direction from the central member,
a top flange extending from the second arm wall at the top edge in a third direction toward the central member, the top flange of the second arm comprising:
a first section having a second plurality of ports, and a second section coplanar with the first section and defining a second top flange space disposed between the first section and the second section, wherein the top flange of the second arm and the planar projection of the central member define a second corner space therebetween;

a first cable tray comprising:

a base of the first cable tray including a first aperture coupled to a first port of the plurality of ports of the top flange of the first arm by a first fastener, a first side wall of the first cable tray extending vertically from the base of the first cable tray, and a second side wall of the first cable tray extending vertically from the base of the first cable tray; and a second cable tray comprising:

a base of the second cable tray including a second aperture coupled to a second port of the plurality of ports of the top flange of the first arm by a second fastener, a first side wall of the second cable tray extending vertically from the base of the second cable tray, and a second side wall of the second cable tray extending vertically from the base of the second cable tray;

wherein the mounting bracket receives stress applied from the first cable tray to the first arm by:

the first section of the top flange of the first arm deflecting relative to the second section of the top flange of the first arm, the first arm deflecting at the first corner space relative to the central member;

wherein the mounting bracket receives stress applied from the second cable tray to the second arm by:

the first section of the top flange of the second arm deflecting at the second top flange space relative to the second section of the top flange of the second arm, the second arm deflecting at the second corner space relative to the central member; and wherein a continuous electrical grounding path is established from the first cable tray to the vertically-oriented pile via the first fastener coupling the first cable tray to the mounting bracket, mounting bracket, and the one or more couplers securing the central member to the vertically-oriented pile, and from the second cable tray to the vertically-oriented pile via the second fastener coupling the second cable tray to the mounting bracket, mounting bracket, and the one or more couplers securing the central member to the vertically-oriented pile.

19. The cable management system of claim 18 wherein: the base of the first cable tray includes a raised embossment on an end of the first cable tray proximal to the mounting bracket, and the base of the second cable tray includes a raised embossment on an end of the second cable tray proximal to the mounting bracket.

* * * * *